United States Patent [19]

Bakharev et al.

[11] Patent Number: 5,584,901

[45] Date of Patent: Dec. 17, 1996

[54] DISPERSED PHASE SEPARATOR

[75] Inventors: Alexander Bakharev, Gorod Yubileynii; Valery Bakharev, Gorod Togliatti, both of Russian Federation

[73] Assignee: Environmental Protection Group, Ltd., West Springfield, Mass.

[21] Appl. No.: 297,534

[22] Filed: Aug. 31, 1994

[30] Foreign Application Priority Data

Jul. 22, 1994 [RU] Russian Federation ........ 94025480/26

[51] Int. Cl.⁶ ........................................... B01D 45/00
[52] U.S. Cl. ........................... 55/442; 55/DIG. 37; 95/267
[58] Field of Search ............................. 55/422, 443, 445, 55/DIG. 37; 95/267

[56] References Cited

U.S. PATENT DOCUMENTS

| | | | |
|---|---|---|---|
| 2,122,511 | 7/1938 | Bubar | 55/443 |
| 2,962,122 | 11/1960 | Linderoth | 55/442 |
| 3,155,474 | 11/1964 | Sexton | 55/442 |
| 3,355,864 | 12/1967 | Sobeck | 55/445 |
| 3,375,058 | 3/1968 | Petersen et al. | 55/442 |
| 4,340,474 | 7/1982 | Johnston | 55/443 |
| 4,471,703 | 9/1984 | Vatsky et al. | 55/442 |
| 4,497,263 | 2/1985 | Vatsky et al. | 55/442 |
| 4,500,332 | 2/1985 | Gillingham | 55/443 |
| 5,221,305 | 6/1993 | Bakharev | 55/442 |

FOREIGN PATENT DOCUMENTS

| | | | |
|---|---|---|---|
| 583261 | 8/1933 | Germany | 55/442 |
| 585277 | 9/1933 | Germany | 55/442 |
| 600289 | 6/1934 | Germany | 55/442 |
| 2155734 | 5/1973 | Germany | 55/442 |
| 135886 | 5/1952 | Sweden | 55/442 |
| 816506 | 4/1981 | U.S.S.R. | 55/443 |

Primary Examiner—C. Scott Bushey
Attorney, Agent, or Firm—McCormick, Paulding & Huber

[57] ABSTRACT

A device for separating particulate matter from a fluid in which such particles are dispersed by causing the fluid to flow longitudinally through a conduit of uniform cross-section and in which a plurality of elements are disposed, with the first of the elements being disposed at an input end of the conduit and sealed against the inner wall thereof. The fluid is caused to flow through the conduit at a velocity such that the particles are fluid-borne. The remainder of the elements are offset laterally inward of the conduit wall by a distance which increases as a function of each element's numerical position after the first element and they are equally spaced apart in a longitudinal direction to provide a gap between successive pairs thereof. Each element, except for an outtake orifice, includes an inner surface disposed at an oblique angle with respect to the longitudinal axis of the conduit. The lateral offset of the elements is such that an outer portion of each downstream element is partially shaded from direct exposure to the longitudinal fluid flow within the conduit. The orientation of successive elements being such that the unshaded or exposed inner edge portions of the obliquely oriented surfaces serve as deflecting regions for the particle laden fluid flow. The deflecting region of each element is generally a non-convex surface and the shaded portion of each element, following the first one, serves as a separating region and with the gap between successive elements provides for the outflow of gas from the inwardly deflected flow. The outtake orifice includes an upper surface that defines the peripheral edge of the orifice which is disposed generally in axial alignment with an innermost edge of the deflecting region of the last of the elements for removing the deflected flow from the conduit.

26 Claims, 9 Drawing Sheets

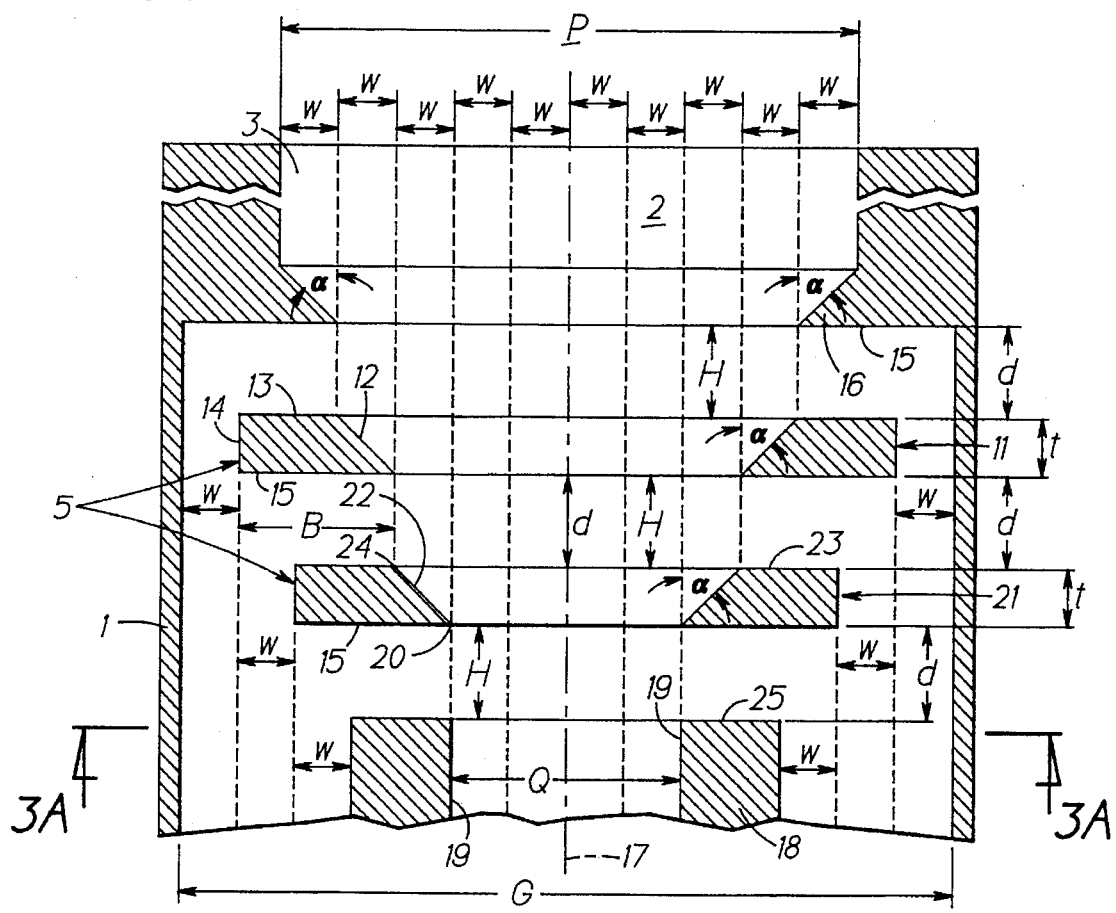

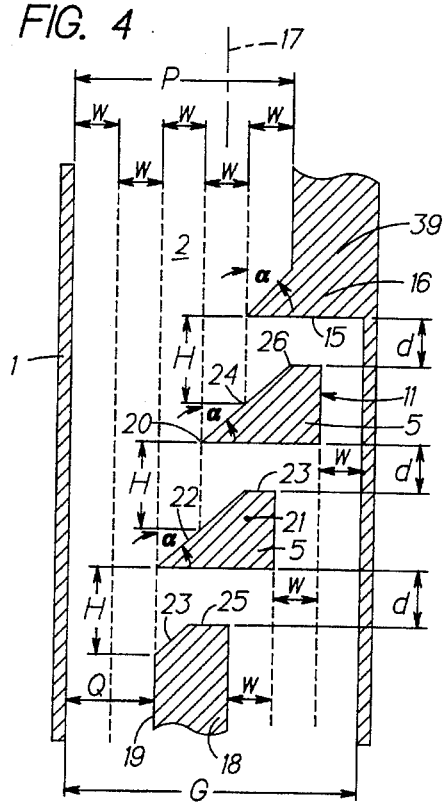
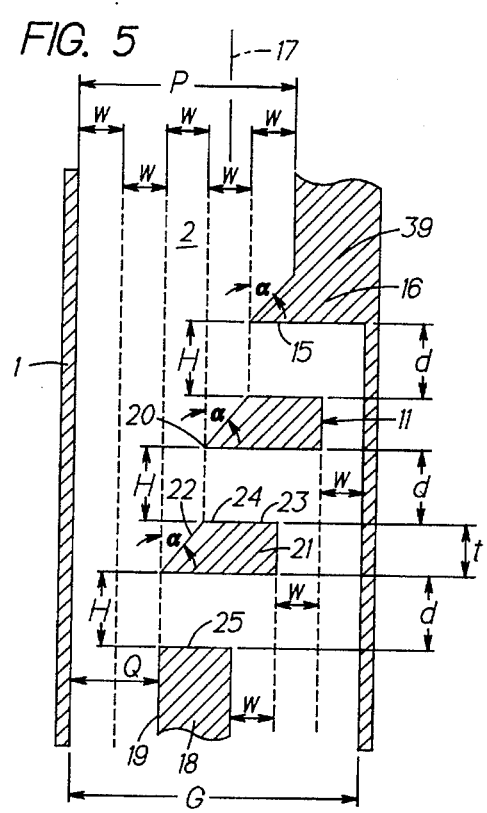
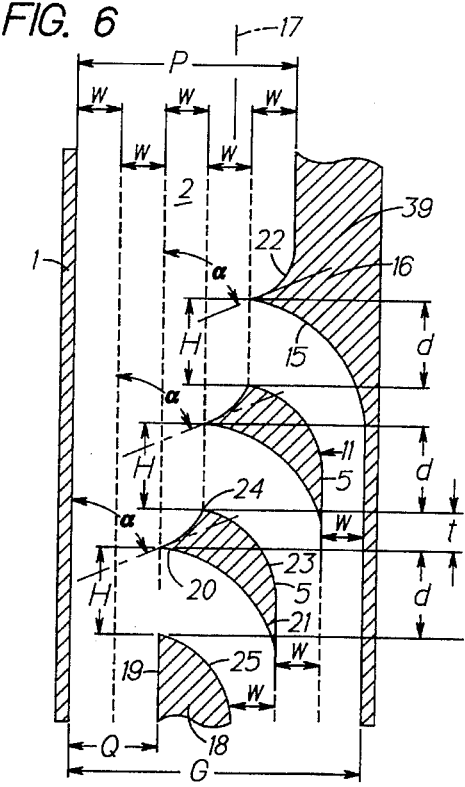
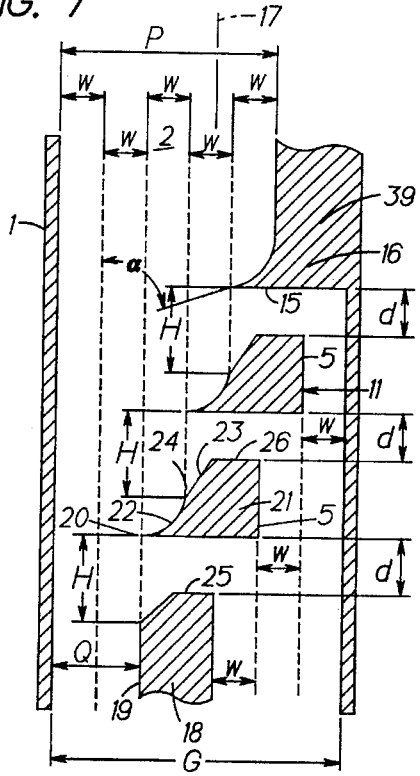

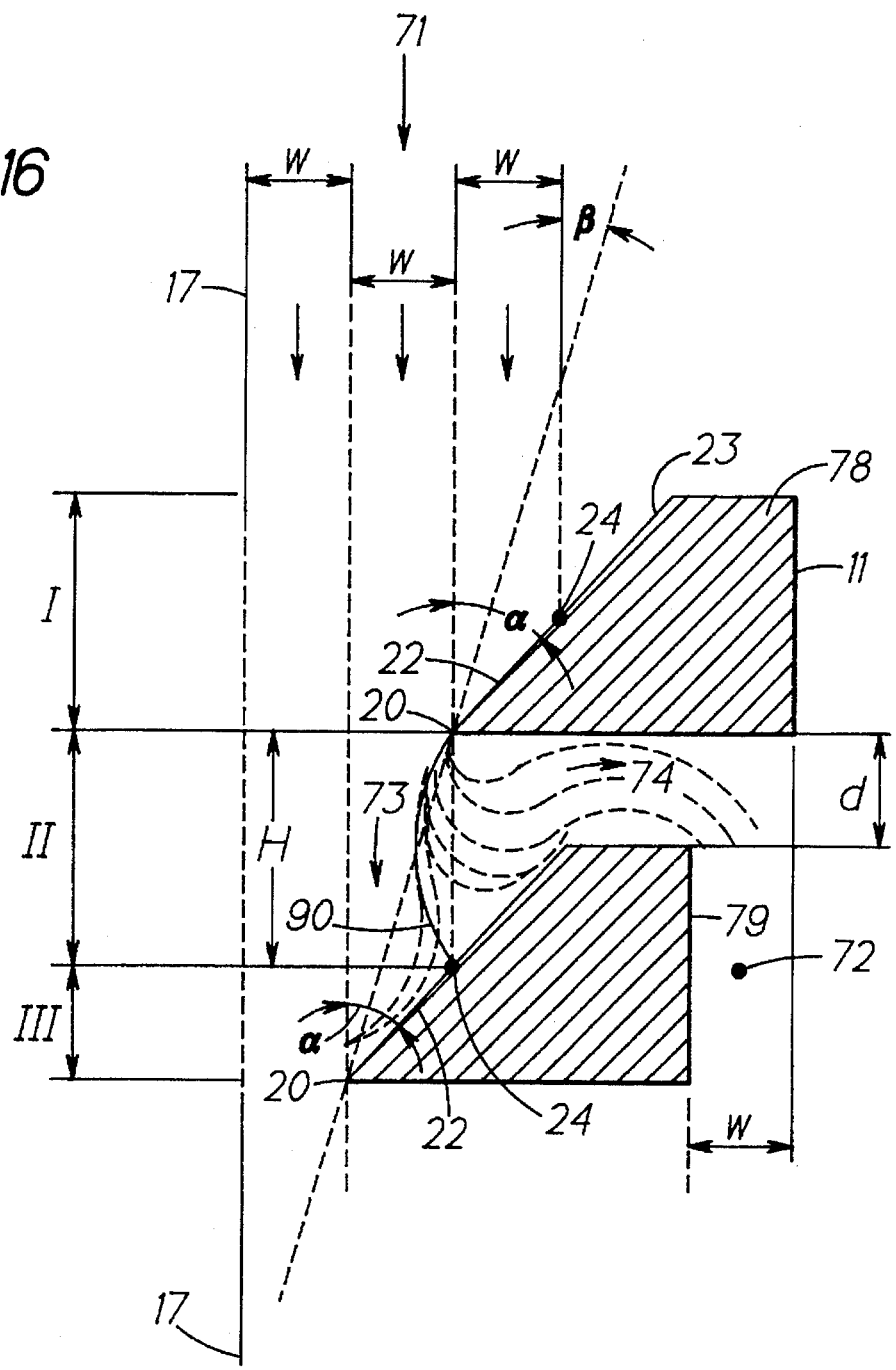

DISPERSED PHASE SEPARATOR

FIELD OF THE INVENTION

This invention relates to devices for cleaning impurities from fluids and more particularly to devices which separate solid particles from a flowing media in which the particles are dispersed.

BACKGROUND OF THE INVENTION

Various types of devices are known in the art for separating and removing solid particulate from fluid flows. Such devices include settling chambers in which large solid particles settle by gravity; centrifugal collectors (cyclones) and inertial dust separators which snake use of inertial effects arising from changes in the direction of the fluid flow to separate particulate matter; filters (baghouses) in which dust laden fluid passes through cloth, paper, fiberglass, etc.; electrostatic precipitators in which the particles are electrically charged in a high voltage electric field and then are drawn to an oppositely charged electrode; and other devices, such as wet scrubbers, in which the dust particles are brought in contact with a liquid and subsequently carried away.

As discussed in our commonly assigned U.S. Pat. No. 5,221,305, which is hereby incorporated by reference, each of the above type devices have characteristic operational parameters which are in part dictated by the device's principle of operation, and which in turn make them better suited to certain applications. One such parameter is optimum flow velocity. For example, electrostatic precipitators must operate at a relatively low gas velocity seldom exceeding 2 meters per second (2 m/s), while inertial dust separators operate at velocities typically between 15 and 30 m/s or even higher. For many industrial applications, the higher velocity is desirable since it implies a higher throughput (the product of a fluid flow velocity and the cross-sectional area of the flow through the device). Therefore, for a given required throughput, the higher the allowed gas velocity, the smaller can be the size of the device. On the other hand, higher velocity implies higher pressure drop across the device, hence higher costs of energy required to operate the device. This creates an tradeoff between throughput and energy requirements.

Another parameter is the fractional dust separation efficiency of a device, commonly defined as the ratio of the weight of dust separated to the weight of incoming dust, commonly expressed in percent (%) as a function of the particle size (diameter) D. The fractional efficiency of a given device is usually presented in the form of a histogram or curve on which the values of efficiency for narrow intervals of particle sizes are plotted as a function of an average particle size in each interval. W. Strauss, "Industrial Gas Cleaning" Pergamon Press, 1966.

Existing inertial separators will usually show a high (over 80% to 90%) efficiency of separation of particles within a certain range of diameters which typically includes the larger particles. The efficiency begins to decline for smaller sized particles. For example, typical industrial cyclones have high efficiency for separation particle sizes greater than 20 to 30 micrometers.

Such high efficiency, at a relatively high flow velocity, in combination with inherently simple operation and low maintenance, make inertial type separators relatively attractive options for use in many industrial and commercial applications. However, the steep decline in particle separation efficiencies for smaller particle sizes, is a drawback of such importance as to lead to the use of other devices such as electrostatic precipitators or baghouses in conjunction with inertial separator.

In one example of a basic inertial type separator, dust-laden fluid flow (e.g., gas and particles exhausted as a result of combustion) is intercepted by a system of spaced inclined plates, or louvers. The gas flow is deflected from its original direction by the louvers whereby part of the gas flow proceeds to pass between the plates or louvers and into the space behind them, while the dust particles continue to move by inertia and collect in the small remaining part of the gas flow, from which they are usually removed with dust-separators of a different kind, such as a filter. The cleaning efficiency depends, among other factors, on the angle of inclination and distances between the plates. A drawback of such a device is that the efficiency for removing smaller particles is relatively low and the use of a different type of device to remove the particles increases the system's complexity and cost.

Another prior art dispersed phase separator is disclosed in U.S. Pat. No. 3,342,024 which, in order to increase the cleaning efficiency in the separation of the dispersed phase, employed two systems of spaced elements, or two gratings, positioned sequentially along the flow of the media to be cleaned. A disadvantage of this device however, is that the two gratings are positioned so close to each other that the flow entering the second grating may be turbulent thereby resulting in reduction of the cleaning efficiency of the second grating.

An additional prior art aerodynamic device, disclosed in U.S. Pat. No. 5,221,305 includes a cylindrical channel having constant cross-section along the length of the device, with a grating comprised of identically convexly shaped elements (rings) axially spaced apart and transversely staggered or offset from a wall within the channel. The axial distance d between adjacent elements is constant and the innermost edge of each element is disposed closer by distance W to the channel axis than an innermost edge of the immediately upstream element. The outline of the outer edges of the plurality of the grating elements is disposed at an oblique angle with respect to the longitudinal axis of the channel. The device also contains means of removing the dispersed phase connected to the hopper and to a source of reduced pressure.

However, the absence of specific guidelines for choosing the optimum parameters of the device, such as the height and the width of the elements, a distance between them, and a transverse shift W, does not allow one to design a separator which will be characterized by filtering out particles in a specific range of diameters.

The first element (ring) of the device, which is connected in a fluid-tight manner to the casing, has the same cross-sectional shape as the rest of the elements. This feature decreases the useful input area of the device, as the outer parts of that first element do not provide for any useful function.

DISCLOSURE OF THE INVENTION

A principal object of the present invention is to provide a high efficiency separator which is optimized for a specific type of flow and particle dispersed therein.

Another object of the invention is to provide a separator capable of removing a broad spectrum of particulate sizes from a fluid flow at high efficiency.

A further object of the invention is to provide a separator for a given application which reduces or eliminates the need for supplementary cleaning devices of various types.

A still further object of the present invention is to provide increased efficiency of separation of the particles of specific fractional composition from the flow by minimizing the number of collisions of the particles of relatively large size with deflecting regions of individual elements of the device.

Another object of the invention is to provide relationships between the parameters characterizing the flow, parameters characterizing the solid particles dispersed in and moving with the flow, and the geometry of the separator to allow one to design an aerodynamic separator which will separate particles from specific ranges of fractional composition, while avoiding unwanted collisions of larger particles.

Yet another object of the invention is to provide a separator which can be used to simultaneously clean the flow from the dispersed phase and to classify collected particles by size.

According to the invention, an apparatus is provided for separating particulate matter of particles larger than a predetermined size from a fluid in which said matter is dispersed. The fluid is caused to flow in a generally longitudinal direction within a conduit of generally uniform cross-section which has a longitudinal axis from an upstream end toward a downstream end thereof. The apparatus includes a plurality of discrete elements from a first upstream element to a last downstream element and at least one intermediate element having inner, lower, upper and outer surfaces for deflecting and separating portions of the fluid flow. The conduit may alternatively have a cross-section of circular or rectangular configuration. The elements are equally spaced apart in the longitudinal direction and follow a first upstream element which is disposed in abutting and fluid sealing relation on a least one wall portion of the conduit. The remaining downstream elements are all transversely offset inwardly of said wall portion of the conduit. The offset increases as a function of the numerical position occupied by each of said remaining elements. Each of the elements includes an inner surface disposed at an oblique angle with respect to the longitudinal axis. Each of the remaining elements is successively spaced inward of each adjacent upstream element. As a result, the innermost edge portion of each upstream element axially overlaps and partially, longitudinally shades an upper surface portion of each successive downstream element. The upstream elements also leave exposed longitudinally at least an innermost edge portion of the obliquely oriented surfaces of each successive elements. The exposed portions of the angled surfaces accordingly define regions which serve for deflecting portions of the fluid flow, including particulate matter of larger size than predetermined particle size entrained therein. The deflecting region of each element is generally a non-convex surface and the shaded portion of each element serves as a separating region thereof for the flow of fluid in which particles of smaller size are borne. A means for removing the deflected fluid flow containing the concentrated particulate matter comprises an orifice defined in part by an upper innermost edge portion of the last of said plurality of elements. The edge portion defining said orifice is longitudinally aligned with the innermost edge of the preceding upstream element.

BRIEF DESCRIPTION OF THE DRAWINGS

The essential features of the invention are further illustrated in the drawings, in which:

FIG. 3 is a cross-sectional schematic representation of the arrangement of the functional components of the aerodynamic separator;

FIGS. 4–9 are illustrations similar to FIG. 3 of various other embodiments of the present invention;

FIG. 16 is a schematic representation of the mechanism of particulate separation of the present invention.

DETAILED DESCRIPTION OF THE PREFERRED EMBODIMENT

Figure 1:
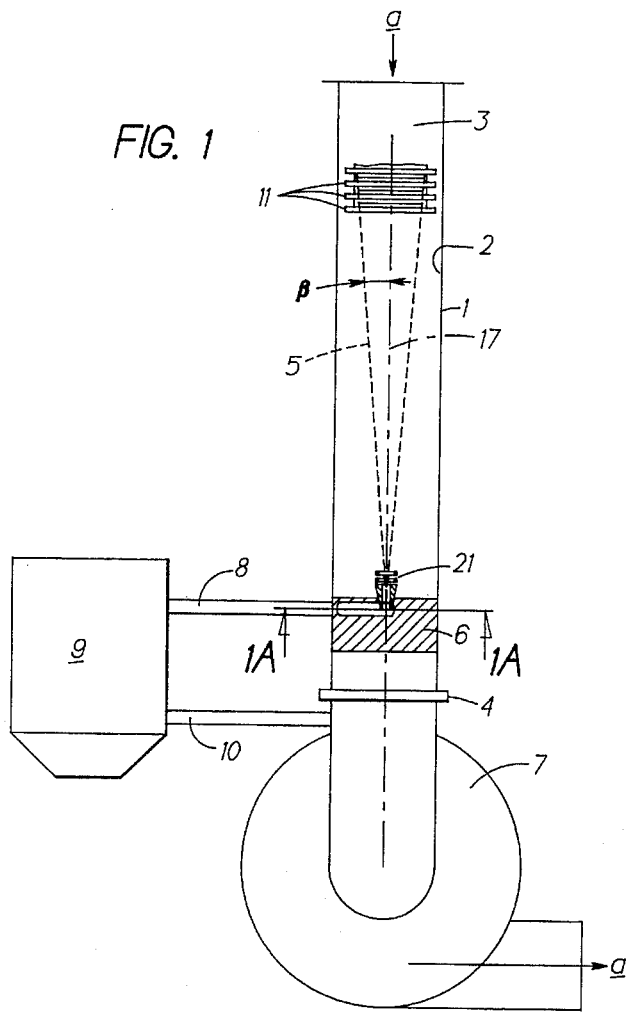
FIG. 1 is an elevational view partly in section of one embodiment of a dispersed phase aerodynamic separator of the present invention.
Figure 1A:
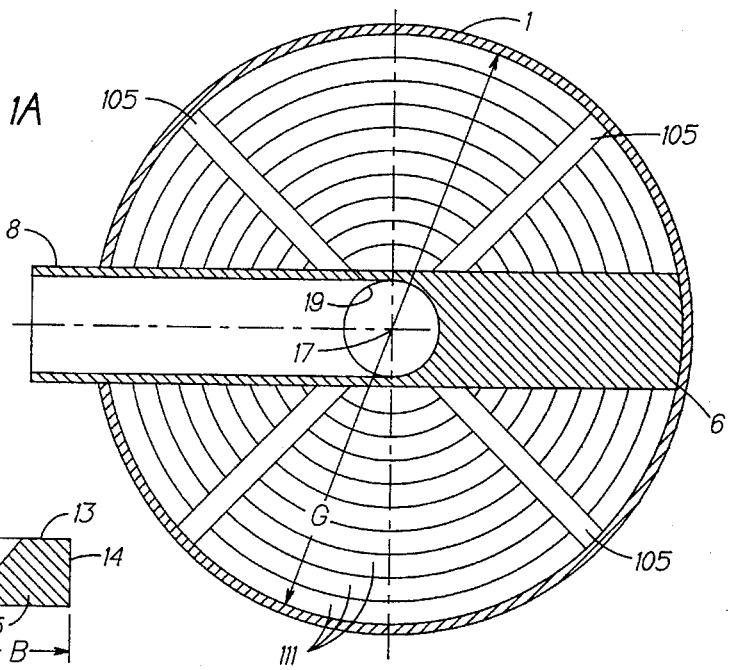
FIG. 1A is a cross-sectional view on an enlarged scale taken along axis 1A—1A of FIG. 1.

Shown in FIG. 1 is an aerodynamic separator of dispersed solid particles from the fluid flow of the present invention generally comprising a conduit or casing 1 which defines a channel 2, input end 3, and output end 4, and a grating 5 disposed at angle β to a longitudinal axis 17. The axis 17 is defined as a centerline of the channel 2 which extends from the input end 3 to the output end 4 of the conduit 1. The casing also includes means for removing the dispersed phase, namely, a dust removing manifold 6. The manifold 6 is connected to the hopper 9 by pipe 8 which serves to conduct the concentrated dispersion from the conduit and into the hopper. The hopper 9 is connected to a blower 7 by pipe 10 which serves to maintain the proper pressure differential between the separator and the hopper. Fluid flows through the casing in a downstream direction which is generally axial (parallel to axis 17) from the input to output ends 3 and 4, respectively, as indicated in the drawing by arrow a. The grating 5 comprises of a number of elements 11 connected to each other and to the casing by ribs or support members 105 (FIGS. 1A and 3A). The ribs 105 are sufficiently rigid to maintain the elements 11 in their precise arrangement. Each grating element, such as 11–21, disposed in a conduit of rectangular cross-section, may comprise at least one member. As shown in FIG. 3A, each element comprises a pair of such members disposed at the same longitudinal axial level in the conduit and in transversely spaced in edge-to-edge relationship, as a mirror image of each other on opposite sides of the axis 17. The ribs 105 prevent deformation of the grating in response to the fluid flow during operation of the separator, or in response to shock or vibration typically encountered during routine shipping and handling. The ribs are also sufficiently thin to present little resistance to the flow.

In the particular embodiment shown in FIG. 1, the channel 2 is defined by a tubular conduit of cylindrical or polygonal cross-section and elements 11 are of diminishing size or radii in the downstream direction of the gas flow from the largest element adjacent the input end 3 to the smallest near the particle removing manifold 6. Each element has an inner surface 12 which functions as a fluid deflecting, or reflecting region, or surface. As shown in FIGS. 2–12, each element 11 also includes an upper surface 13, an outer surface 14 and a lower surface 15. An innermost edge 20 is disposed at the junction of the inner surface 12 and lower surface 15.

The overall shape of the grating 5 is an imaginary outline of the plurality of its elements 11, taken for example along the innermost edges 20 of said elements. This outline in the cross-section with the radial plane containing the channel axis 17 makes an oblique angle $\beta$ with the axis 17, as shown in FIG. 1.

It is important that the flow entering the input end 3 of a separator be laminar. In order to achieve this goal, there should be a length of straight piping of width or diameter equal to the width or diameter of the input end 3, this piping being disposed upstream of the separator. In applications in which a separator is installed into a generally straight duct, the length of such a straight pipe should be equal or greater than two (2) diameters of the input end 3. In applications in which a separator is installed into a generally curved duct, the length of a straight pipe should be equal or greater than six (6) diameters of the input end 3.

As shown in FIGS. 3–9 and 12, with the exception of the first element 16, and the last element 18, all the intermediate grating elements 11 including the last downstream element 21 are identical in cross-sectional shape or configuration. It is important that each element's innermost edge 20 is shifted by distance W radially or transversely of the axis 17 inward from the inner wall of the conduit 2 to which the first element is affixed. Elements 16 and 11 are placed at equal axial or longitudinal distances d from each other, distance d being greater than W.

Figure 12:
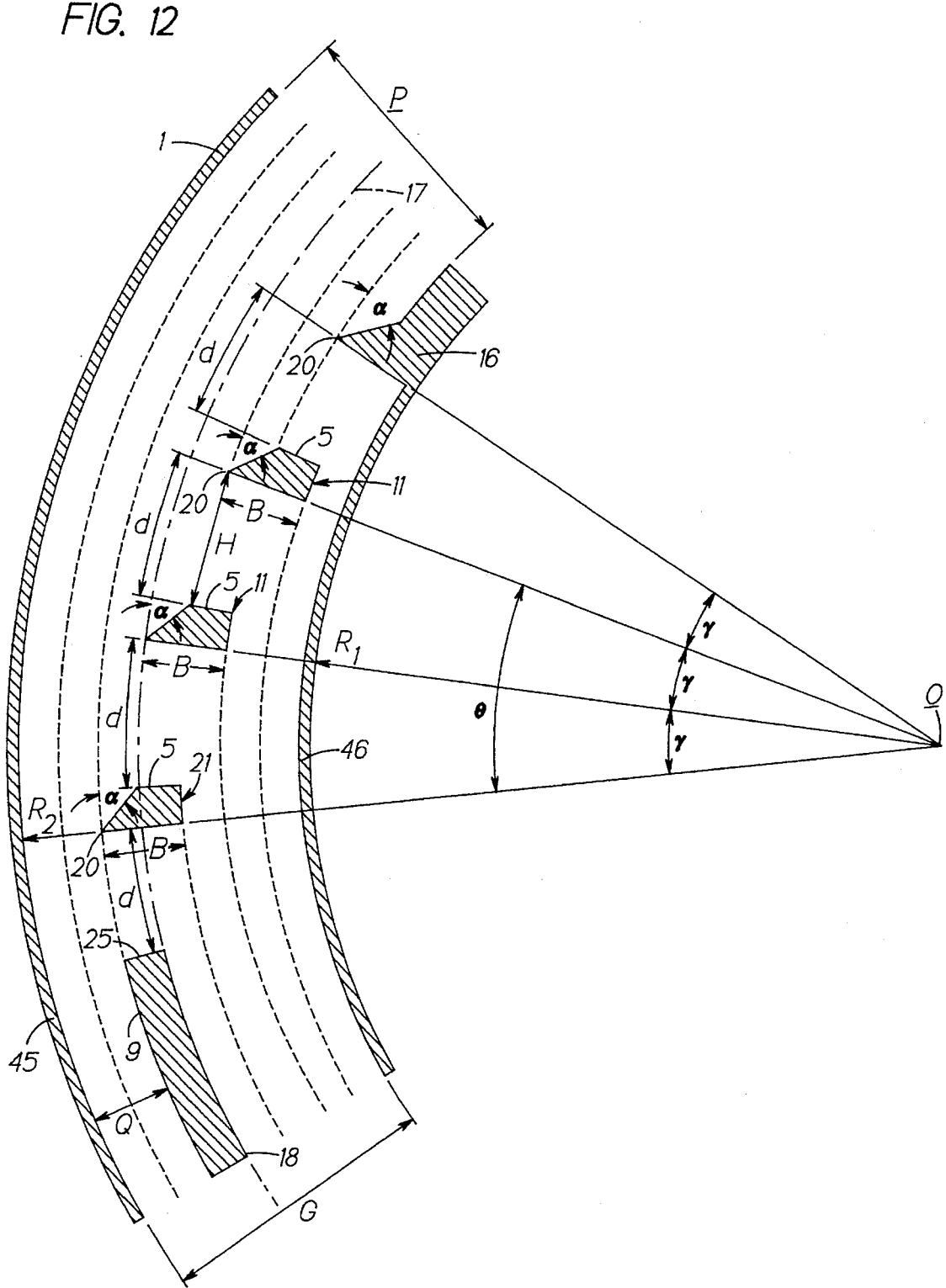
FIG. 12 is an illustration similar to FIGS. 4–9 showing another embodiment of the present invention.

The distance d is defined as the axial length between lines which extend in a direction transverse to the axis 17 from the innermost edge 20 of each upstream element and the uppermost point of the surface 13 of a next downstream element, said distance measured between the points at which those lines intersect the axis 17, as best illustrated in reference to FIG. 12. The ratio d/W can preferably be chosen from the interval of values from one (1) to approximately ten (10). In this range, choosing a smaller d with respect to W will provide a grating which will be axially shorter which may be beneficial in some industrial applications, but at the same time will tend to increase the relative resistance of the grating to the flow which may be generally undesirable.

The thickness of an element 11, t, is defined as the axial length between lines which extend in a direction transverse to the axis 17 from the innermost edge 20 of an element and from the uppermost point of the surface 13 of the same element. Note that for element shapes shown in FIGS. 2–5, 7–9 and 12, this definition corresponds to the usual definition of thickness, while for elements shown in FIG. 6, it corresponds to the thickness of the inner part of the element facing the flow.

The distance H is the longitudinal distance between the innermost edge 20 of each element, such as 16 or 11 to the next adjacent downstream element, such as 11 or 18. Note that for element shapes and arrangements shown in FIGS. 3,5, 6, 8, 9 and 12, distances d and H are equal to each other, while for element shapes and arrangements shown in FIGS. 4 and 7, H is greater than d, since in those cases, the innermost edge 20 of the preceding element overlaps the surface 12 of the succeeding element.

Figure 2:
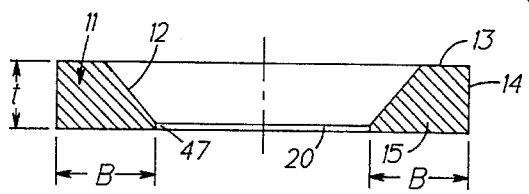
FIG. 2 is a cross-sectional view of a ring type element of the type used in the separator of the present invention.

The width B of each element 11 is best shown in a cross-section of an element with the plane perpendicular to the element's innermost edge 20 and containing channel axis 17, as shown in FIGS. 2, 3 and 12. Width B is defined as the distance between the innermost edge 20 and the outermost point of the element's outer surface 14, measured in the direction perpendicular to the channel axis 17. Note that for a ring-shaped element, such as shown in FIG. 2, the width B equals one-half of the difference between the outer and the inner diameters of a ring.

FIGS. 3–9 and 12 also show the intake orifice 18 of the dust removing manifold 6. The inner surface 19 of the intake orifice 18 is aligned with the innermost edge 20 of the last element 21 in the direction of the axis 17.

As also shown in FIGS. 3–12, the inner surfaces 12 and upper surfaces 13 of elements 11 including the last element 21 comprise two regions performing different functions in the operation of the aerodynamic separator: a deflecting region 22 corresponds to the inner surface 12 and a separating region 23 corresponds to the upper surface 13 and, in some implementations, may be partly on the inner surface 12; the border between the regions being indicated at 24. The deflecting region 22 is defined as a region from the innermost edge 20 to a line on the inner surface 12 axially aligned with the innermost edge 20 of the preceding upstream element.

FIGS. 3–9 depict embodiments with the channel 2 of rectangular or polygonal cross-section in a plane perpendicular to axis 17. They differ from each other by having different cross-sections and geometries of the elements 16 and 11, and by having different intake orifices 18 for removing the dispersed phase. In addition, the border 24 between the deflecting and separating regions 22 and 23 may be disposed on the surface of the inner surface 12 (see FIGS. 4 and 7), or on the edge 26 separating the inner 12 and upper 13 surfaces of an element 11 (FIGS. 3, 5, 6, 8–12). In the latter case, the whole inner surface 12 of an element 11 functions as the deflecting region 22.

The deflecting regions are made to be non-convex, i.e., are either planar, as shown in FIGS. 3–5, 9 and 12, or concave, as shown in FIGS. 6, 7, 8, 10 and 11 and all the elements of a given grating are conformed to make the same angle $\alpha$ between the tangent to the deflecting region 22 on the innermost edge 20 and the axis 17 of the channel 2.

As best shown in FIGS. 3, 4–9 and 12, the first elements 16 of the gratings 5 contain only the deflecting regions 22 of the inner surfaces 12 and lower surfaces 15 and they are disposed directly and in a sealed manner to the inner surface 2 of the casings immediately downstream of the input end 3, the wall 39 of said input end 3 providing for laminar flow and for the correct impact of a flow layer of a width W on the deflecting region 22 of the first element 16.

The intake orifice 18 of the means of removing the dispersed phase is disposed at a distance H axially downstream from the innermost edge 20 of the last downstream intermediate element 21 of the grating wherein the innermost edge 19 of the outtake orifice 18 is aligned with the innermost edge 20 of the element 21 in the direction of the channel axis 17. The shape and size of the upper surface 25 of this outtake orifice 18 is preferably identical to the shape and size of the separating regions 23 of the elements 11 and 21.

As shown in FIGS. 4 and 5, the elements may be of a trapezoidal cross-section with smaller and larger bases corresponding to the upper surface 13 and the lower surface 15 of an element 11 and with a side which is perpendicular to the bases and parallel to the axis 17 of the channel 2 corresponding to the outer surface 14 of an element 11, the fourth side corresponding to the inner surface 12.

Independent of the element's profile, as shown in FIGS. 7–8, 10 and 11, it is preferable to make the concave-shaped deflecting region 22 of the inner surface 12 so that a cross-section thereof taken along a plane perpendicular to the innermost edge 20 and containing the channel axis 17, is of arcuate shape. This shape reduces the probability of particle collisions with this surface for larger angles α. In addition, this shape allows to continuously change the flow direction for the part of the flow W which is being cleaned while reducing flow turbulization.

In a case when the border 24 between the deflecting and the separating regions is located on the inner surface 12 of an element 11 (see FIG. 7) and the deflecting region is concave, the outline of the cross-section of the inner surface 12 of the element with the plane containing the channel axis 17 and perpendicular to the innermost edge 20 is an arc of a circle in the deflecting region 22 and a straight line in the separating region 23.

As best shown in FIGS. 3 and 12, all the elements 11 have equal width B, which in combination with the aforementioned distance W by which each innermost edge 20 of element 11 is transversely offset relative to the upstream element, allows to thereby maintain a generally constant cross-section for the fluid flow within the channel 2, and to provide for laminar flow at the output end 4 of the separator.

Figure 10:
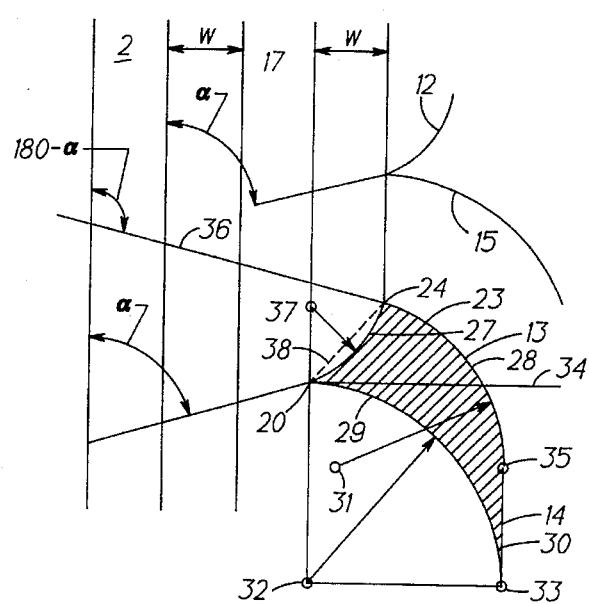
FIGS. 10 and 11 are enlarged views of elements as shown in FIGS. 6 and 8, respectively.

The distance d between the elements, as discussed above, and the shape of the elements 11 determine the resistance of the grating 5 to the flow. In order to reduce this resistance one typically chooses d>W, as also stated above. For the same purpose, the upper and lower surfaces 13 and 15, respectively, of the elements 11 may be streamlined, as shown in FIGS. 6 and 10. As also shown in these figures, each element, except for the first one 16, has a cross-section formed by three circle arcs 27, 28 and 29, (FIG. 10), corresponding to the inner, upper and lower surfaces 12, 13 and 15, respectively, of an element 11 and a straight line 30, which is parallel to the channel axis 17, corresponding to the outer surface 14. The circle arcs 28 and 29 have corresponding circle centers 31 and 32, respectively, disposed on the side of the lower surface 15. The circle arc 29 fairs into the straight line 30 which corresponds to the outer surface 14, at a point 33 and fairs with another straight line 34 which is perpendicular to the channel axis 17 at the innermost edge 20 of an element 11. The other circle arc 28 fairs with the straight line 30 at a point 35. A line 36 is tangent to the arc 28 at the point 24 corresponding to the border between the deflecting 22 and separating 23 regions (in this case region 23 coincides with the upper surface 13) and is directed at an angle 180°−α to the channel axis 17.

This shape of the elements of the grating is preferable with respect to minimizing the resistance of the grating to the flow, with respect to minimizing the turbulence, and minimizing the probability of particle collisions with the surface of element 11.

Depending on the value of α (which plays a role in determining the limiting diameter of the separating particles $D_0$), the cross-sectional shape of the deflecting region 22 may be a straight line 38 rather than an arc of a circle 27 with the center 37. In this regard, it is preferable to use a straight line for a relatively small α, and for a large α, an arc is preferable in order to reduce particle collisions with the elements, as will be discussed in greater detail hereinafter.

Figure 8:
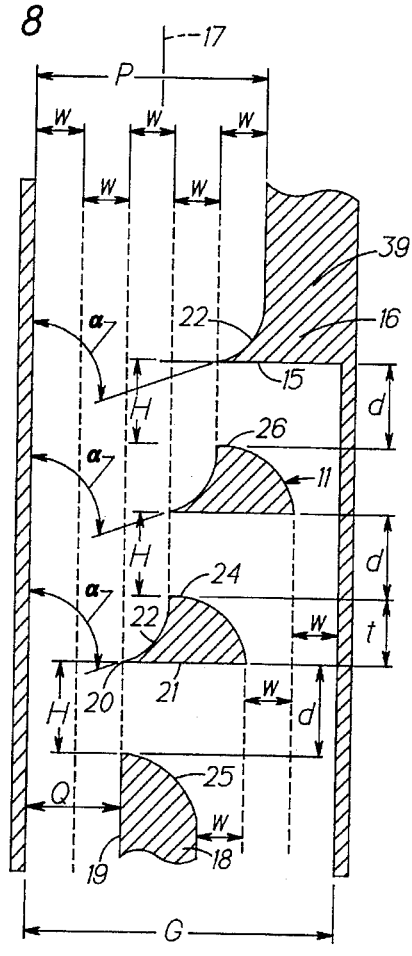
Figure 11:
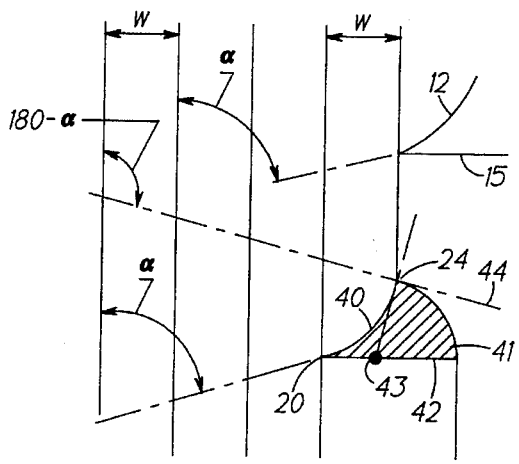

A simpler shape of the elements which is also conducive to the lowering of the resistance to the flow is shown in FIGS. 8 and 11. In this case, the cross-section of each element of the grating, except for the first one, is a figure defined by the two circle arcs, 40 and 41, and by the straight line 42 which is perpendicular to the channel axis 17, so that the straight line 42 corresponds to the element's lower surface 15, the upper and outer surfaces correspond to the arc 41 which has a center 43, intersects the straight line 42 and has a tangent 44 at the point 24 corresponding to the border between the deflecting 22 and separating 23 regions directed at an angle 180°−α to the channel axis 17.

Figure 9:
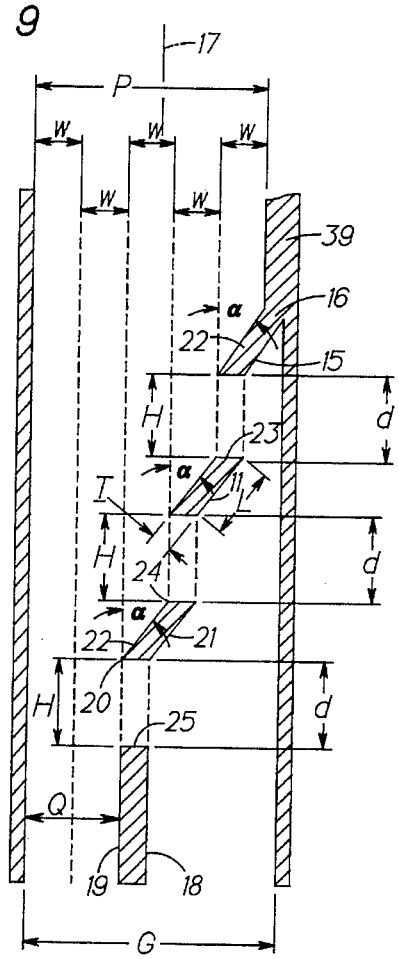

Referring now to the embodiment of FIG. 9, the aerodynamic separator may also utilize a rectangular casing 1 and each element 11 of the grating may be made in a shape of a flat plate of thickness T, of width L, where T<L. In this embodiment, the shift W is related to L and α by the relationship W=L sin α. This implementation of the grating elements reduces the amount of material used in an aerodynamic separator construction, while retaining high collection efficiency.

It should be understood by one skilled in the art that aerodynamic separators of the present invention as shown in FIGS. 4–9 may be provided with cylindrical casings and annular elements or rings in which the schematic cross-section of such separators can be depicted by taking FIGS. 4–9 and adding to them the mirror-image of the figures on the left side (allowing for a channel 2 of twice the width G shown in the figures, with the inner surface of the left wall shown therein coinciding with the center axis 17 of the cylindrical casing), so that the cross-section of these aerodynamic separators in a plane perpendicular to the innermost edges 20 of elements 11 and containing the channel axis 17 will be similar to the cross-section of a separator as shown in FIG. 3.

For both rectangular and cylindrical casings, the width (diameter) of the input end 3, the width (diameter) of the channel 2 and the width (diameter) of the intake orifice 18 of the means of removing dispersed phase 6, in FIGS. 3–9 and 12, are denoted P, G and Q, respectively, said width (diameter) measured in the direction transverse to the channel axis 17 and perpendicular to the innermost edges 20 of elements 11.

Figure 3A:
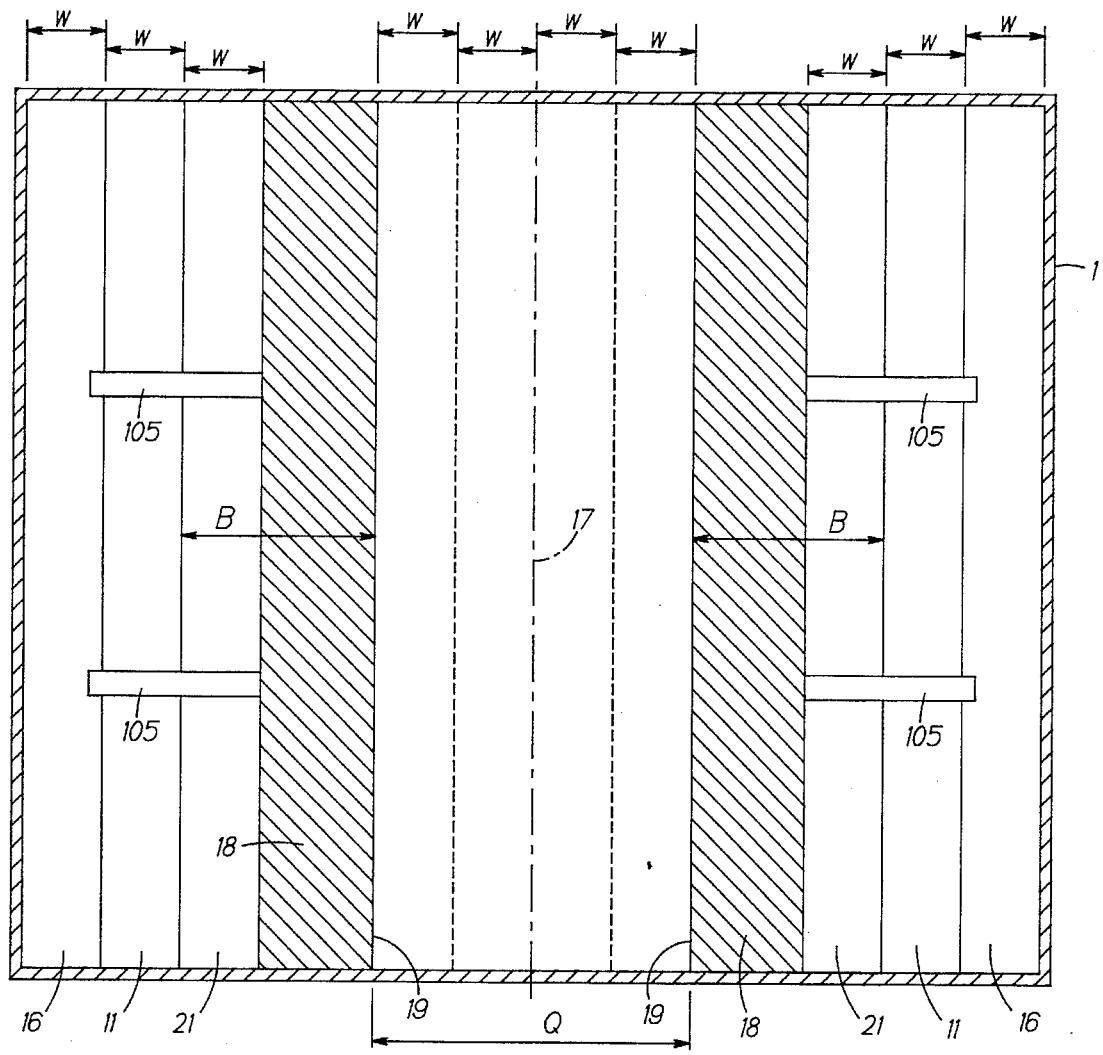
FIG. 3A is a cross-sectional view on an enlarged scale taken along 3A—3A of FIG. 3.

It should also be understood by one skilled in the art that aerodynamic separators of the present invention having longitudinally straight rectangular casings may contain two gratings representing the two sides of a truncated prism with an angle 2 β at the imaginary apex. This prism is positioned with its base toward the input end of the aerodynamic separator. In this case, the schematic cross-section of such aerodynamic separators can be depicted by taking FIGS. 4–9 and adding to them their mirror-image on the left side (allowing for a channel 2 of twice the width G shown in the figures with the inner surface of the left wall shown therein coinciding with the center axis 17 of the rectangular casing), so that the cross-section of these aerodynamic separators with the plane perpendicular to the innermost edge 20 and containing the channel axis 17 will be similar to the cross-section of a separator as shown in FIG. 3. The cross-section of such a double-grating separator with the plane perpendicular to the channel axis 17 is shown in FIG. 3A.

The preferred overall geometry of a grating of all separators having longitudinally straight casings is given by the relation β=arctan [W/(t+d)].

Referring now to the embodiment shown in FIG. 12, the casing 1 is curved so that its center line or axis 17 conforms to the arc of a circle. The casing 1 is of rectangular cross-section in the plane perpendicular to the axis 17. The flat side walls, which are not shown, are parallel to the plane of the drawing. The other two walls of the casing, 45 and 46, which are perpendicular to the plane of the drawing, are concentrically curved along the circle arcs of radii $R_1$ and $R_2$, respectively, of which $R_2$ is greater than $R_1$. It is recommended that $1<R_2/R_1<2$ for curved casings. This is beneficial for creating an orderly laminar flow. In a curved casing with a stronger curvature, the flow may become shifted in the transverse direction and generally distorted.

All the elements 11 of the grating, plus the first element 16, in this embodiment are disposed at equal angles $\gamma$ from each other, these angles being measured between radial lines drawn from the common center of curvature O of the concentric walls 45 and 46 to the innermost edge 20 of each element, as shown in FIG. 12. By virtue of this construction, any two adjacent elements 11 in a grating 5 and element 16 are rotated by an angle $\gamma$ with respect to each other and placed at an equal axial distance d with respect to each other, said distance measured along the center axis 17 of the casing. The upper surface 25 of the intake orifice 18 is also placed at an axial distance d with respect to the last element 21 of the grating 5.

In order to simplify the schematic depiction of the grating in FIG. 12, as in the other figures, only a small number of elements 11 are shown. In actuality, the number of elements 11 may range from 1 to several dozen or higher, depending on the size of the device and on its desired application.

Experiments show that the innermost edge 20 does not have to be sharp. In order for the aerodynamic separator to function effectively (this applies to a variety of element shapes, including those shown in FIGS. 3, 4–9), it is sufficient that the deflecting region 22 of the inner part 12 and the lower part 15 be connected via a chamfered or beveled surface which has an axial height which is much smaller than H, e.g., smaller than 10% of H. In particular, as shown in FIG. 2, for manufacturability considerations it is convenient to produce ring elements of the grating in which the deflecting region 22 and the lower part 15 are connected in the cross-section with a short line 47 which is generally parallel to the channel axis 17.

In order to avoid the undesirable penetration of the dispersed particles between the last elements of the grating, as well as between the last element 21 of the grating and the outtake orifice 18 of the means for removing the dispersed phase 6, the resistance to the flow of the fluid containing concentrated dispersed phase at an outtake orifice 18 must be equal or less than the resistance to the flow in the transverse direction (relative to the axis 17), away from the outtake orifice 18. With this aim in mind, where a rectangular casing being used, the distance between opposite walls of the cross-section of the outtake orifice 18 taken in the direction perpendicular to the innermost edges 20 of elements 11, denoted as Q, preferably satisfies the relationship $Q/W \geq 2$ for a single grating, as shown in FIGS. 4–9 and 12, and $Q/W \geq 4$ for two (2) gratings installed in the casing, as shown in FIG. 3. For a cylindrical casing, Q is the diameter of the outtake orifice 18 which preferably satisfies the relationship $Q/W \geq 4$, as also shown in FIG. 3, which can serve as a depiction of both rectangular and cylindrical casings, as was described above.

In order to reduce the transverse components of the flow velocity, with the goal being to correctly direct the flow to the deflecting regions of elements 11, for both rectangular and cylindrical casings 1 being used, as shown in FIGS. 3–9 and 12, the width (diameter) P of the input end 3 in the direction perpendicular to the innermost edge 20 of an element 11 of the grating 5 and to the channel axis 17, can be chosen from the condition $$P = G - n(B-W)$$

where n=1 for a single grating installed in a rectangular casing, and n=2 for two gratings in a rectangular casing, or for a cylindrical casing.

Figure 13:
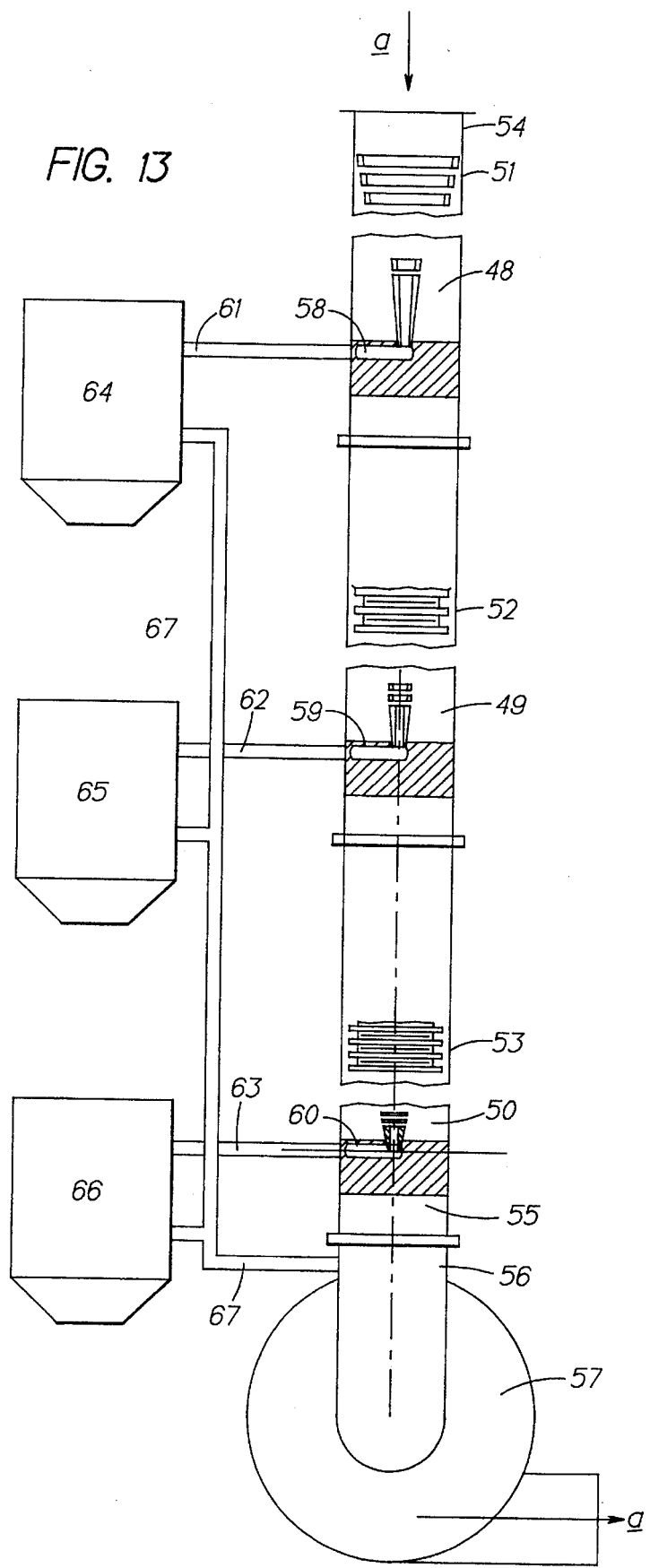
FIG. 13 is an elevational view illustrating a multi-stage embodiment of the present invention.

Referring now to FIG. 13, in order to increase the efficiency of dust separation from the flow one can simultaneously use several serially-connected aerodynamic dust separators analogous to the ones described above. The multi-stage aerodynamic dust separator of FIG. 13 has three serially connected single aerodynamic dust separators 48, 49 and 50 with gratings 51, 52 and 53. The common input end of the device is the input end 54 of the aerodynamic dust separator 48, and the common output end 55 is the output end of the aerodynamic separator 50. The output end 55 is connected to the input (suction) end 56 of the blower pump 57. The apparatus of FIG. 13 also contains dust-removing pipes 58, 59 and 60, connected with pipes 61, 62 and 63 to hoppers 64, 65 and 66 for each stage of the apparatus respectively. All the hoppers are connected to the suction pipe 56 of the blower pump 57 via the common line 67. The multi-stage system may also be configured to feed into a single hopper (not shown).

The quantities H and W characterizing the constructions of each of the gratings 51, 52 and 53 diminish along the flow direction from the aerodynamic dust separator 48 towards the aerodynamic dust separator 50. At the same time angle $\alpha$ and the number N of the elements of the grating (in this embodiment, the number of rings) is increasing from one aerodynamic separator to the next one in the downstream direction.

Figure 14:
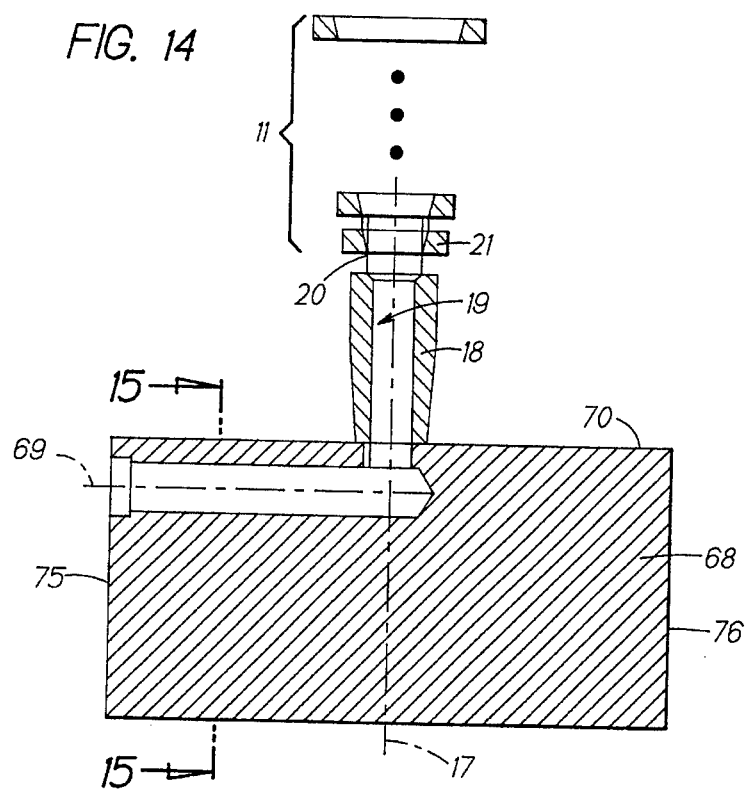
FIG. 14 is a cross-sectional view illustrating means for removing the dispersed phase of the present invention.
Figure 15:
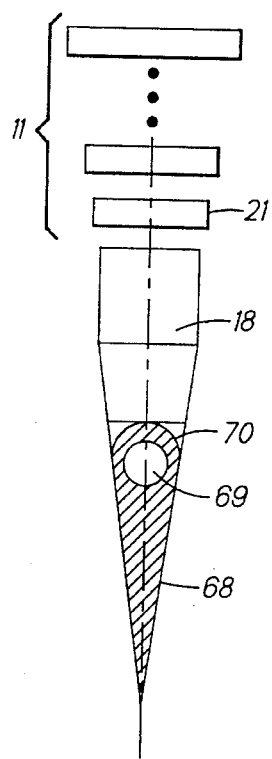
FIG. 15 is a cross-sectional view taken along 15—15 of FIG. 14 of the present invention.

In case of the aerodynamic separator of the present invention with a cylindrical casing, referring now to in FIGS. 14 and 15, in order to prevent unwanted turbulization of the flow after having passed through the grating 5 and in order to direct a non-disturbed flow to the input of the next serially-connected aerodynamic dust separator in a multi-stage aerodynamic separator, the means of removing the dispersed phase is a fairing 68 which is made in the form of a symmetrical wing engaged by its flat sides or butt-ends 75 and 76 to the inner surface of the casing 1. As shown in FIG. 15, the fairing has a streamlined teardrop cross-section with its rounded surface 70 facing in an upstream direction towards the input end of the separator. A bore 69 extends longitudinally through the fairing from end 75 to a point beyond the center thereof and the intake orifice 18 is centrally disposed on the upstream surface 70. The bore of the intake orifice 18 inter-sects the bore 69 of the fairing. Furthermore, as discussed hereinbefore, the innermost edge 19 of the intake orifice 18 is aligned with the innermost edge 20 of the last element 21 of the grating in the direction of the channel axis 17.

For a casing 2 having a straight channel, the relationship between the limiting diameter $D_0$ with the parameters of the gas flow and geometrical characteristics of the grating can be determined from the relation $$W/\alpha = K\ v\rho D_0^2/9\ \mu$$

where W is the transverse displacement or shift of any downstream element's innermost edge 20 toward the axis 17 of the channel 2 with respect to the innermost edge of the nearest upstream element; α is an angle between the tangent to the deflecting surface 12 of the element of the grating at its innermost edge 20 and the axis of the channel in the plane normal to the innermost edge 20 and containing the axis 17; v is the velocity of the flow entering the separator; ρ is the density of the material comprising the particles of the dispersed phase; $D_0$ is the limiting diameter of the particles which can be collected in a separator with given geometrical characteristics. Namely, particles smaller than $D_0$ will on the average escape with the flow of the partially cleaned medium, while particles larger than $D_0$ will, on the average, be concentrated and collected in the hopper; μ is the viscosity of the fluid; and K is the dimensionless coefficient which must be determined experimentally and which generally depends on the properties, such as characteristic particle shapes, of a specific type of dust.

Although the formula does not allow independent determination of W and α, angle α should not be chosen arbitrarily. As discussed above, the angle should not be too large. If it is too great, large particles will mechanically impact on the deflecting regions of the separator elements and scatter uncontrollably, which will lead to escape of the particles between the elements and therefore decreased efficiency of the separator as well as increased wear on the elements. The angle is preferably estimated or determined empirically by observing the efficiency of separation based on testing of a variety of angles. Once α is chosen for the first stage (or for the only stage in a single-stage device), one can use the relationship given above to determine W. The separator of the present invention is preferably employed in industrial installations where v typically does not vary over wide ranges and is typically between 15 to 30 meters per second in a gas flow (in a liquid v is typically an order of magnitude smaller). At any rate, v can be determined for a given application and a separator can then be designed based on this formula. In addition, the number of collisions of the larger particles with deflecting regions of the elements 16 and 11 may be minimized by reducing the velocity v of the flow. (See examples below).

In order to find coefficient K for a given type of dust (e.g., cement dust or fly ash dust) one can feed a fluid having a known fractional composition (percent of particles of various diameters) of the given dust dispersed therein, into a separator of the present invention. The fractional composition of the dust collected in the hopper can then be measured.

Next, the limiting diameter $D_0$ can be determined. The limiting diameter $D_0$ is preferably defined in terms of the fractional cleaning efficiency of a separator as discussed above. Accordingly, $D_0$ can be chosen as the particle size at which the steady high efficiency of the separator begins to decline. Typically, $D_0$ is chosen as the value of D at which the efficiency drops by 10% from its steady high value, or alternatively as corresponding to the value of D for which efficiency drops to 50% of the high value. The difference between whichever value is chosen will be absorbed by the coefficient K in the formula.

Knowing $D_0$ and all the other parameters in the formula (taken from those of the aforementioned test), one can determine K for the given type of dust and then use the formula as a guide to design efficient particle separators of this invention to separate particles with $D > D_0$ of the given type of dust from a specific fluid flow.

The constant of proportionality K in the formula would be equal to unity if all the assumptions were exact and if the flow was of a simple viscous type described by Stockes law. In other words, the dimensionless Reynolds' number of the particle in a flow $Re = \rho_f v_{rel} D/\mu$, where $\rho_f$ is the density of the fluid, $v_{rel}$ is the relative fluid velocity with respect to the particle, D particle diameter, and μ fluid viscosity, should not be excessively high. It can be shown that for the particles with limiting diameter $D_0$ the relative velocity with respect to the fluid is maximum where the fluid turns around the innermost edge 20 of an element 11. At that point, $v_{rel}$ can approach the velocity of the fluid v, although it is always true that $v_{rel} < v$. One can check that for a 10 micron particle in air, with the air moving against the particle with velocity of 25 m/s, Re<20. The corrections to Stockes law in that region are relatively minor. They will be largely absorbed by the empirical coefficient K in the formula. This allows one to use fairly simple theory relevant in the regime of viscous flow.

In a liquid flow, allowing for realistic $v_{rel}$, Reynolds' numbers for a particle will be similar or smaller than the Re given above for air. For example, in water, $\rho_f$ and μ are respectively about three orders of magnitude and two orders of magnitude greater than in air. Thus, at comparable $v_{rel}$, the Re of a particle in water is about an order of magnitude higher than in air. However, it is unrealistic to use water flow at the same velocity as an air flow in a separator device. With an order of magnitude reduction, $v_{rel} \sim 1 \div 2$ m/s, Re of a particle in water will be similar to Re in air.

For larger particles and higher relative speeds, Re may become large enough to introduce certain corrections to the formulas. These corrections are well-known in the art (see Strauss, cited above). It should be understood by those skilled in the art that the formula for W/α can be modified to incorporate these corrections, and that in that case the functional dependence between the parameters of the formula may become more complex. These corrections are not very relevant for our device and we do not consider them here.

When an aerodynamic separator having a curved casing is used, the relationship is given as:

$$W/(\alpha+\gamma) = K\, v\rho D_0^2/9\, \mu$$

where γ is an angle by which any element of the grating is rotated with respect to its adjacent element, said angle taken to be positive and equal to the angular extent θ of the grating 5 for all elements 11 from the first to the last element thereof, divided by (N−1) where N is the number of elements 11 in the grating, whereby:

$$\gamma = \theta/(N-1)$$

where θ and γ are measured from the common center of the two concentrically curved walls of the separator casing 2. The operation of the separator with curved walls adds to the separation effect of the elements 11 the well-known separation effect utilized by prior art cyclone separators, in which the particles of the dispersed phase are pushed toward the larger radius of the curved channel due to inertial forces acting on a curved trajectory. The summary of the two effects allows for increased efficiency of this device relative to a similarly dimensioned separator having a straight casing. It therefore follows that the curved path allows either a reduction in the number of elements N for a given limiting diameter $D_0$ or, for a fixed N, a reduction of $D_0$.

For any type of a casing described above, the number of elements 11 in the grating 5 (i.e., the total number of identically shaped elements; the first element 16 being excluded from this number) can be determined from the relation $$N=[[(P-Q)/2\ W]-1]n$$

where n=1 for a single grating and n=2 for a double grating. Note, that in case of a curved rectangular casing, there is always a single grating, and thus in this case, n=1. Further, in case of a curved casing, we can express N as $$N=[\theta/\gamma]+1$$

where $\theta$ is the angular extent of the grating 5, $\gamma$ is the angle between the inner edges of any two adjacent elements 11, measured from the common center of concentrically curved walls of the separator.

The principle of operation of the aerodynamic separator of the present invention is clarified in FIG. 16. Laminar flow 71 which comprises a flowing media and the dispersed phase carried thereby, moving with velocity v, interacts with the first element 16 and elements 11 of the grating 5. Each element 11 serves two functions: as a deflector and as an aerodynamic separator of the particles in the flow. The function of the deflecting surface 22 is to change the direction of the flow from its initial direction parallel to the axis 17, and hence to change the trajectory of the particles in the flow. The function of the separating region 23 is to deviate part of the flow containing particles of smaller fractional sizes into the region 72 beyond the grating, between the grating and the casing 2. By virtue of being offset from one another by the distance W, transverse to axis 17, each subsequent deflecting region 22 interacts with a new layer of the flow 71 of width W.

In order to clarify the mechanism of interaction of particle-laden flow with the elements 16 and 11, it is convenient to consider general features in the movement of particles with diameter D larger than $D_0$ (the limiting diameter for the geometry of a specific aerodynamic separator) and particles with diameter D smaller than $D_0$ as they move with the flow in the consecutive regions I, II, III, shown in FIG. 16.

In the region I, a layer W of the flow interacts with an upstream element 11. If we were considering the input end of the device (not shown in FIG. 16), this layer would be interacting with the first element 16. In a general case however, this may be any upstream element of a pair of elements 11 (elements 78 and 79 of FIG. 16). As the layer W of the flow 71 encounters the deflecting region 22 which is inclined at an angle α (or more specifically, as discussed above, a tangent to the region 22 at innermost edge 20 is inclined at an angle α), the flow changes the direction of its motion. The particle moving with the initial flow therefore experiences a transverse force due to the changing direction of the flow and, itself, starts to move transversely toward the axis 17 of the channel according to the Newtonian laws of motion and pursuant to aerodynamic forces applied to it. Because of its inertia, the particle will tend to move closer to the deflecting surface 22 of the element. This produces the effect of "focusing," or of bringing all the particles from the layer W closer to the deflecting surface and eventually closer to the innermost edge 20 of the element. As a result of this first curved motion, the particles in layer W acquire a component of velocity directed approximately at the angle α to the channel axis 17 toward the axis.

Although the majority of particles will not, larger particles may mechanically impact on the deflecting surface 22. Of course, the probability of such an impact depends on the shape of the deflecting surface, which is in part characterized by the angle α, whereby the larger the angle α, the more likely it is that the particle will mechanically impact with the deflecting surface. As mentioned above, angle α should therefore not be too large, preferably less than or equal to forty-five degrees (45°) for elements having straight deflecting regions in cross-section. Angle α could however be greater for curved (concave) deflecting regions 22.

The consequences of such an impact, if it occurs, will be minimized for the particles striking the deflecting surface at glancing angles to the surface. Such a collision if it occurs, is less likely to significantly deviate the particle from its course and furthermore, aerodynamic effects may overcome pure inertial effects produced by the collision and carry the particle over the surface. For example, the particle may acquire rotation as if rolling along the surface and it may therefore experience the well-known aerodynamic "Magnus" effect (effect of a "curve ball" pitch in baseball) which will tend to direct it even more toward the axis of the device.

The flow next proceeds into the region I1 which is characterized by the gap d between upstream and downstream elements 78 and 79 respectively. At this point, the particles start to move across the flow which is sharply turning around the innermost edge of the element and into the space between the elements in the direction 74. This produces a dragging force on the particles and the particles turn toward the deflecting surface of the next downstream element 79. Smaller particles turn more than larger ones, whereby the smaller particles (generally particles having $D<D_0$) will escape with the flow 74 between the elements and continue beyond the grating into the region 72, while larger ones ($D>D_0$) will cross the turning flow layer W and move towards the next downstream deflecting surface of element 79. Particles of the critical diameter, $D_0$, will be on the boarder of these two groups and will move along the trajectory closely resembling an arc of a circle 90 and find themselves at the point axially downstream of the innermost edge 20 of the upstream element, at the boundary 24 of the deflecting region 22. The particles of sizes greater than $D_0$ move in the general direction 73 dictated by the deflecting region 22.

In the region III the next layer of the flow of thickness W impacts onto the deflecting region 22 of the next downstream element 79 which then deflects the flow in a manner similar to that discussed above with respect to the upstream element 78. However, this layer W contains particles with sizes greater than $D_0$ from the first layer W considered above.

The processes described above take place on the first element 16 and all N elements 11 of the grating 5; as a result, the particles of larger fractional composition ($D>D_0$) are concentrated in the central or axial part of the flow near the last element of the grating, which is disposed in alignment with removing manifold 6, while smaller particles ($D<D_0$) remain dispersed within the partially cleaned gas or fluid. The fluid may undergo further cleaning (separation by size) in subsequent separating stages.

In multi-stage aerodynamic separators the grating of the first stage is made with a sufficiently small angle α, so that the largest particles contained in the flow generally do not experience direct collisions with the deflecting surfaces of the grating. They are deflected toward the flow axis, and eventually most of the particles with sizes greater than $D_{01}$ get collected in the first stage hopper. The flow with particles having sizes $D<D_{01}$ is delivered to the entrance (input end) of the second stage. The parameters of the second and subsequent stages are chosen as described above to separate particles with diameters from $D_{02}$ to $D_{01}$, from $D_{03}$ to $D_{02}$, etc. into the respective hoppers of these subsequent stages.

Absence of direct mechanical impacts of the particles onto the reflecting surfaces of the elements of grating facilitate achieving high cleaning efficiency.

From what was discussed above, one skilled in the art can also see that a sufficiently high selectivity of particle classification can be achieved in multi-stage aerodynamic separators.

The proposed devices will work with higher efficiency in terms of particle separation and will be able to separate smaller particles when the transverse shift W, and, consequently, the size of the gap d, are chosen to be smaller. However, this leads to an increase in the number of elements in the grating and makes precise positioning of the elements more difficult. This invention therefore creates an interplay between available technology for producing and precisely positioning the elements and the desire to effectively separate smaller particles. In this connection, it should be understood that the size and placement of the elements 11, including dimensions W, d and H must be held to close tolerances, preferably not varying by more than five percent (5%,) of the value of W from element-to-element. For a typical value of W=1 mm this implies tolerances of 0.05 mm. Achieving such tolerances is a non-trivial task.

The above described operation of the device is based on both inertial and aerodynamic principles. Indeed, as described above, the organization of a particle trajectory in the device can be viewed as a combination of two curved motions, one near the deflecting region 22 in region I, and the other in region II described above, each of them similar to the curved motion of a particle in a cyclone cleaning device, but with some important differences.

Of these differences, the most important one is that in most inertial devices, particles must experience mechanical collisions with various surfaces. In a cyclone, for example, the particle is forced by inertia to the wall of the device, where it impacts on the wall, slides down and gets collected. In contrast, in the present device, the ideal operation is achieved when particles are flowing on air (or fluid in general) without any mechanical impacts. Additional subtle aerodynamic effects, such as the "Magnus" effect discussed above, may also play a role in the operation of the device. In this sense, this is an aerodynamic device rather than a pure inertial device.

EXAMPLES

A three-stage cylindrical system with nominal input diameter of 100 mm was designed and built. The elements were rings made of steel. All relevant sizes were made to a tolerance of better than 0.05 mm, including alignment of the elements in the grating. In cross-section, the shape of the rings was similar to the one shown in FIG. 2. Having in mind a typical test dust, such as phosphate which has density $\rho \approx 2.5$ g/cm$^3$ and contains a wide range of particle sizes from a few microns to about one hundred microns, the three Stages I, II and III were designed to remove particles with high collection efficiency in the overlapping approximate composition ranges 100 to 15 microns, 30 to 10 microns, and 20 to 7 microns, respectively. The angles $\alpha$ were chosen empirically. The three stages had the following geometrical characteristics:

Stage I: Rings of thickness t=20 mm, distances between them d=10 mm, $\alpha$=20°, W=3.75 mm, $\beta$=7.12°, number of rings (excluding the first element) N=11.

Stage II: Rings of thickness t=8 mm, distances d=8 mm between them, $\alpha$=30°, W=2.0 mm, $\beta$=7.12°, number of rings N=22.

Stage III: Rings of thickness t=5 mm, distances between them d=5 mm, $\alpha$=45°, W=1.0 mm, $\beta$=5.7°, number of rings N=47.

A number of tests were performed on this system, of which two are described as follows:

1. Phosphate dust from a sealed bag (i.e., dust which was not run through the system previously, or "virgin" dust) was run through the three stages at an air flow velocity of about 25 m/s. The dust was weighed before its introduction into the system and whatever was collected in the three hoppers was weighed after the run. The weight of the dust going into the system was 1,132 grams; the first hopper collected 1,105 grams, second 19 grams and third, 3 grams. The error in the weight measurement was ±0.5 gram. This corresponds to a total collection efficiency for virgin phosphate dust of 99.6% ±0.05% in the three stages. The first stage collected 97.6% of the dust, second, 1.7%, and third, 0.3%.

Note, that while the overall efficiency of the system and the efficiency of the first stage are correctly given by the numbers above, the second and third stage efficiencies are not at all the same as the percentages above. To calculate these efficiencies, one needs to know the amounts of dust entering the second and the third stages which are not directly measured in this experiment.

Examination of the dusts collected in the three hoppers showed that the first hopper collected larger particles, while the second and third hoppers collected sequentially smaller particle sizes.

Several runs on a phosphate which was previously run through the system ("non-virgin") have shown essentially 100% efficiency, to the precision of the measurement. These measurements show very clearly: (a) the capability of the multi-stage system with specially designed different stages to remove dust in the wide range of fractional compositions with high efficiency, and that the system generally performs as expected according to the present patent, and (b) that dust which was previously run through the system lost all the fractions which the system cannot capture and the remaining fractions can now be captured to the 100% efficiency. This, among other things, points to the reliability of system operation according to its design.

2. Glass beads of uniform 108±10 micrometer size were run through the system.

In the first run, the air velocity was measured to be 20 m/s. The weights into the system and in the three hoppers were 1,000 g, 587 g, 77 g and 46 g, respectively. This gives total efficiency of 71.0%, with the first stage capturing 58.7%, second 7.7% and third, 4.6% by weight.

In the second run, the same glass beads were run through the system at 6 m/s. The weights into the system and in three hoppers were 780 g, 712 g, 25 g and 11 g, respectively. The total efficiency was thus 95.9%, the first stage collected 91.3%, the second 3.2% and the third, 1.4% by weight.

This dramatic increase of efficiency upon reduction of a flow speed for relatively large size particles (beads) illustrates that avoiding collisions with the deflecting surfaces is extremely important. For a fixed geometry of a system, the only way to lower the number of collisions is to decrease the speed. Once this is done, the first stage designed for capturing larger particles performs as expected. Alternatively, one could decrease the angle $\alpha$, which was not done in the experiment performed.

It should be recognized by one skilled in the art that one may design a device pursuant to the aforementioned specifications for separation of dispersed particles from a liquid fluid rather than from a gaseous fluid, and still remain within the spirit and scope of the present invention.

It should also be recognized by one skilled in the art that the shapes of the cross-sections of grating elements, shown herein, do not exhaust the multitude of possible shapes in which they can be implemented, but represent the more desirable implementations either in view of their effectiveness in dust separation, or manufacturability and that numerous alternate configurations could be devised while remaining within the scope of the present invention.

Having described the invention, what is claimed is:

1. An improved apparatus for separating and collecting particles of larger than a predetermined limiting diameter $D_0$, of the particle material density $\rho$, from a fluid of viscosity $\mu$ in which said particles are dispersed, including a wall defined conduit having a longitudinal axis of symmetry, an input end and an output end downstream of the input end in which the fluid dispersion is introduced into the conduit as essentially a laminar flow at a predetermined velocity $v$ whereby said particles are fluid-borne therein for movement generally parallel to said longitudinal axis, the improvement comprising at least one grating including a plurality of elements from a first upstream element having a non-convex inner surface extending transversely a distance W toward said axis, said inner surface being angled toward the downstream end of the conduit from a generally abutting relation with a wall portion of the conduit so that the inner edge portion of said inner surface forms an angle $\alpha$ with said longitudinal axis; said elements further comprising a last downstream particle-collecting element and at least one intermediate element disposed between the first and last elements, each of said elements following the first element including outer, upper and inner surfaces, each of the innermost edge portions of said intermediate elements being successively spaced transversely inward by distance W of each adjacent upstream element so that there is a partial transverse overlap such that at least a portion of the inner surface transversely extends inwardly toward said axis by said distance W, this portion of the said inner surface serves to deflect a layer of said fluid flow adjacent said inner surface inwardly toward said longitudinal axis, and the overlapping part of the inner and upper surfaces serving as separating regions for receiving fluid flow not directed inwardly by the deflecting surfaces, with outer surfaces thereof being also spaced from the wall of the conduit by the distance W or multiples thereof depending upon the relative numerical position of each element from the upstream element, said elements also being equally spaced apart by distances d from the innermost edge of the preceding upstream element in a direction generally parallel to said longitudinal axis, the inner surfaces of the intermediate elements being of generally the same geometrical shape, with all deflecting surfaces being of non-convex shape and having the inner edge portions of said inner surfaces form generally the same angle $\alpha$ with the said axis as the first element, wherein for a said chosen velocity of the fluid flow $v$ at the input end of the conduit, and for a said particle material density $\rho$ of the particles dispersed in a fluid and for a viscosity of the said fluid $\mu$, the construction of said grating being such that the ratio of W/$\alpha$ is directly proportional to the particle-characterizing parameter $\rho$, to the square of the particle-characterizing predetermined limiting diameter $D_0$, $D_0^2$, and directly proportional to the fluid-characterizing parameter $v$ and inversely proportional to the other fluid-characterizing parameter $\mu$.

2. The improved apparatus as set forth in claim 1, and in which said last element comprises means for extracting from the conduit the inwardly deflected fluid flow containing the particles to be separated by the apparatus, said means including an intake orifice defined in part by an upper surface of the last element, said upper surface being generally the same size and shape as the separating region of said at least one intermediate element and in which the inner edge of said upper surface is axially aligned with the innermost edge or the adjacent upstream intermediate element, and the innermost edge of each element, except for the last one, is disposed inwardly by generally the same distance from the innermost edge of the immediately preceding element.

3. The improved apparatus as set forth in claim 1, in which the innermost edge portions of any intermediate element downstream of another element being offset laterally inward of the innermost edge of the preceding upstream element, a lower and inner portion of the oblique inner surface exposed to the fluid flow being of concave configuration and serving as a deflecting region, the upper and outer portion of the oblique inner surface of each downstream element being shaded by the inner edge portion of the preceding element, said upper portion being of planar configuration and serving as a separating region for removing the undeflected fluid-borne particles outwardly of said elements, exposing longitudinally at least an innermost portion of the oblique inner surface of each successive downstream element and shading longitudinally the upper portion of said surface such that the exposed portion of said oblique surface defines the deflecting region of each element adapted for deflecting a portion of the fluid flow including particulate matter generally larger in size than said predetermined particle size entrained therein and the shaded portion of each said elements serving as the separating region thereof.

4. The improved apparatus as set forth in claim 3, wherein the conduit is straight in its longitudinal direction and geometric parameters of the grating and of the elements which comprise the grating are related to parameters characterizing the fluid flow and of the particulate matter dispersed in said flow, by the equation:

$$W/\alpha = K\ v\rho D_0^2/9\ \mu$$

in which W is said transverse distance by which each innermost edge is successively spaced inward from each upstream element;

$\alpha$ is an angle between the longitudinal axis of said conduit and the deflecting surface or a tangent thereto, at the innermost edge;

$v$ is the velocity of the flow entering the separator;

$\rho$ is the density of the particles of the dispersed phase;

$D_0$ is the limiting diameter whereby in general, particles having a diameter greater than $D_0$ will be separated from the flow and collected in a separator with given geometrical characteristics;

$\mu$ is the viscosity of the fluid; and

K is a dimensionless coefficient.

5. The improved apparatus as set forth in claim 3, wherein the conduit is longitudinally curved along an arc of a circle and parameters of the grating and of the elements which comprise the grating are related to parameters characterizing the fluid flow and of the particulate matter dispersed in said flow, by the equation:

$$W/(\alpha+\gamma) = K\ v\rho D_0^2/9\ \mu$$

where W is said transverse distance by which each innermost edge is successively spaced inward from each upstream element;

α is an angle between the longitudinal axis and the deflecting surface or a tangent thereto at the innermost edge;

v is the velocity of the flow entering the separator;

ρ is the density of the particles of the dispersed phase;

$D_0$ is the limiting diameter whereby in general, particles having a diameter greater than $D_0$ will be separated from the flow and collected in a separator with given geometrical characteristics;

μ is the viscosity of the fluid;

K is a dimensionless coefficient;

γ is an angle by which any element, except for the last element, is disposed with respect to its adjacent element, said angle equal to the total angular extent θ subtended by all the elements, except for the first and the last elements, divided by the number of elements in the grating N minus one, whereby:

$$\gamma = \theta/(N-1)$$

and where the θ and the γ are measured from the center of the arc of the conduit.

6. The improved apparatus as set forth in claim 3, and in which said conduit is of a longitudinally curved configuration over its length.

7. The improved apparatus as set forth in claims 4 or 5, in which said obliquely angled surface in a cross-section taken along a plane perpendicular to the innermost edge of an intermediate element and containing the conduit axis is generally a straight line and the oblique angle with respect to the longitudinal axis is not greater than 45 degrees.

8. The improved apparatus as set forth in claims 4 or 5, and wherein for each element, except for the first one, a cross-section thereof taken along a plane perpendicular to an innermost edge and containing the conduit axis, comprises at least one polygon with smaller and larger upper and lower surfaces, respectively, with an outer surface which is perpendicular to said upper and lower surfaces and parallel to the conduit axis corresponding to the outer surface of the element, and with the inner surface of the element comprising a planar surface disposed at said oblique angle and extends generally from the upper toward the lower surface of said element.

9. The improved apparatus as set forth in claims 4 or 5, and in which said oblique surface in a cross-section taken along a plane perpendicular to the innermost edge of an intermediate element and containing the conduit axis is generally of concave curvature.

10. The improved apparatus as set forth in claims 4 or 5, and in which said oblique surface in a cross-section along a plane perpendicular to the innermost edge of an intermediate element containing the conduit axis is a combination of a straight line and a curved line of concave configuration.

11. The improved apparatus as set forth in claims 4 or 5, and in which a cross-section of the deflecting and separating regions of each element, said cross-section along a plane perpendicular to an innermost edge thereof and containing the conduit axis, is an arc of a circle in the deflecting region and a straight line in the separating region.

12. The improved apparatus as set forth in claims 4 or 5, wherein for each element, a cross-section of the deflecting region taken along a plane perpendicular to an innermost edge thereof and containing the conduit axis, is an arc of a circle.

13. The improved apparatus as set forth in claim 4, and in which said conduit is cylindrical, said elements are annular in shape and said innermost edges are radially offset inwardly of the conduit.

14. The improved apparatus as set forth in claim 5, and in which said conduit is a tubular member of polygonal cross-section in a plane perpendicular to the conduit axis.

15. The improved apparatus as set forth in claims 4 or 5, wherein a distance Q between opposite walls of the cross-section of the intake orifice, said distance taken in the direction perpendicular to the innermost edges of the elements, satisfies the relationship $$Q/W \geq 2n$$

where n=1 for a single grating disposed in a conduit of rectangular or polygonal cross-section, and n=2 for a rectangular or polygonal conduit having two (2) gratings disposed in transversely spaced edge-to-edge relation therein, or for a cylindrical conduit.

16. The improved apparatus as set forth in claims 4 or 5, wherein a conduit has a transverse rectangular cross-section, an inner width P of the input end taken in a direction perpendicular to the innermost edge of an element thereof and to the conduit axis is chosen from the condition $$P = G - n(B - W)$$

where G is the inner dimension of the conduit and B is the width of an element, both taken in a direction normal to the element edges and perpendicular to the axis, and where n=1 for a single grating installed in the rectangular conduit, and n=2 for a rectangular conduit having two (2) gratings disposed in transversely spaced edge-to-edge relation therein or for a cylindrical conduit.

17. The improved apparatus as set forth in claims 4 or 5, and in which each of the elements comprises at least one member having a generally rectangular configuration in cross-section transverse to the conduit axis, each member being disposed within a conduit of rectangular cross-section and in which said elements are offset transversely from one wall of the rectangular conduit.

18. The improved apparatus as set forth in claim 4 or 5, wherein each of the elements comprises at least one member having a cross-sectional configuration of a parallelogram of thickness T and width L, so that T is less than L, with the transverse distance W being determined by the expression $$W = L \sin \alpha.$$

19. The improved apparatus as set forth in claims 4 or 5, wherein each element, except for the first one, comprises at least one member having a cross-sectional shape in a plane perpendicular to an innermost edge thereof and containing the conduit axis, defined by three (3) circle arcs and a straight line which is parallel to the conduit axis, with the straight line corresponding to an outer surface of the element and fairing with one end of a first of said arcs, the second and third arcs defining the lower and inner surfaces respectively, said first and second arcs having centers therefor on the downstream side of the element, the second arc at one end thereof fairing with said straight line and at the other end thereof, fairing with a second straight line perpendicular to the longitudinal axis and the other end of the first arc fairing with a third straight line which is disposed at an acute angle to said axis and the third arc has its center of curvature on a line perpendicular to the second straight line.

20. The improved apparatus as set forth in claims 4 or 5, wherein each element, except for the first one, comprises at least one member having a cross-sectional shape in a plane perpendicular to an innermost edge thereof and containing the conduit axis, defined by two circular arcs and a straight line which is perpendicular to the axis, with the straight line corresponding to a lower surface, and upper and outer surfaces being a circular arc with its center disposed on said straight line and with the tangent to said circular arc at the point between the deflecting and the separating regions being directed at an angle $180°-\alpha$ to the conduit axis.

21. The improved apparatus as set forth in claims 4 or 5, wherein each element has a configuration such that in a cross-section formed by a plane perpendicular to an innermost edge of said element and containing the conduit axis, includes a deflecting region on the inner, lower surface portion of said element which is defined to be of such an extent that along a line extending parallel to the axis, the deflecting region has a length of less than 10% of distance between the innermost edge of an upstream element and the deflecting surface of the adjacent downstream element.

22. The improved apparatus as set forth in claims 4 or 5, wherein said elements comprise a first grating and at least one subsequent grating disposed sequentially downstream of said first grating.

23. The improved apparatus as set forth in claim 13, wherein the means for removing the dispersed phase comprises a fairing in the form of an elongated member disposed on the conduit, and having teardrop shaped transverse cross-section, with a bore disposed longitudinally therethrough, art input end disposed coaxially with said axis whereby the wider side of the fairing is facing toward the input end of the separator.

24. The improved apparatus as set forth in claim 22, wherein each downstream grating differs from an adjacent upstream grating so that at least one of the quantities W and $1/\alpha$ of the downstream grating is smaller than the corresponding quantities for the preceding upstream grating.

25. The improved apparatus as set forth in claim 22, wherein each subsequent downstream grating is disposed with respect to an adjacent upstream edge of the adjacent upstream means for removing the dispersed phase at a distance exceeding twice the smallest transverse dimension of the conduit.

26. A dispersed phase separator comprising a casing having a channel of constant cross-section for fluid to flow from an input to an output end, an axis extending longitudinally through said channel, a grating comprising at least one stage of a plurality of elements including a first, last and identically shaped discrete, intermediate elements, each comprising inner, upper and lower surface portions and deflecting and separating regions, and including an innermost edge defined by the intersection of said inner and lower surface portions, the elements of said stage having a generally equal space longitudinally therebetween, said space being defined as the distance between lines extending transversely to the longitudinal axis from said innermost edge of each element at the point at which the lines intersect said axis, said distance exceeding a transverse distance by which each element is offset with respect to an adjacent element, the transverse direction being defined as generally perpendicular to the longitudinal axis of the channel, the grating being disposed at an oblique angle to said axis, and a means for removing the dispersed phase, said deflecting region being defined by the area of said inner surface of an element between its innermost edge and a line generally parallel to and aligned with the innermost edge of the next upstream element, said deflecting region being non-convex, the first element having a non-convex inner surface consisting of a deflecting region of said element and extending from a generally abutting relation with adjacent wall of said casing, means for removing the dispersed phase including an inner edge thereof being axially aligned with the inner edge of the last element, said last element being spaced at a distance from an input end of the removing means equal to the distance between said elements, and the shape of said elements including the separating region and the upper region thereof and of the input end of the removal means taken along a plane perpendicular to the inner edge and containing the axis of the separator, being generally of the same cross-sectional shape.

\* \* \* \* \*